(No Model.)
R. M. HUNTER.
ELECTRICAL MEASURING INSTRUMENT.
No. 520,361. Patented May 22, 1894.
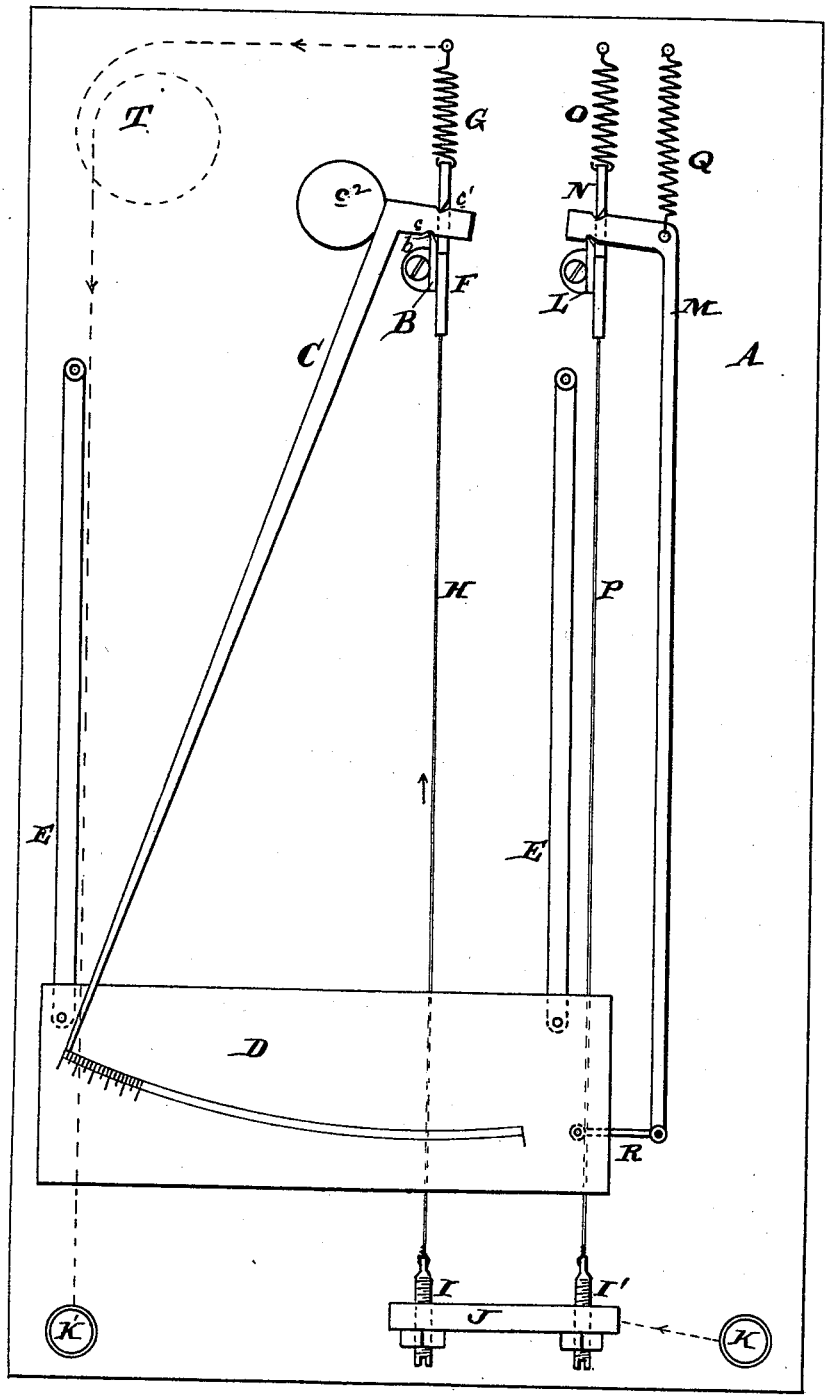
Attest.
H. L. Motherwell
C. H. Newcomb
Inventor
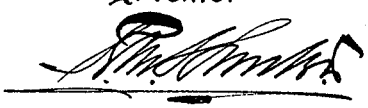

UNITED STATES PATENT OFFICE.

UNITED STATES PATENT OFFICE.

RUDOLPH M. HUNTER, OF PHILADELPHIA, PENNSYLVANIA, ASSIGNOR TO THE THOMSON-HOUSTON ELECTRIC COMPANY, OF CONNECTICUT.

ELECTRICAL MEASURING-INSTRUMENT.

SPECIFICATION forming part of Letters Patent No. 520,361, dated May 22, 1894.

Application filed April 13, 1894. Serial No. 507,348. (No model.)

*To all whom it may concern:*

Be it known that I, RUDOLPH M. HUNTER, of the city and county of Philadelphia and State of Pennsylvania, have invented an Improvement in Electrical Measuring-Instruments, of which the following is a specification.

My invention has reference to electrical measuring instruments, and consists of certain improvements all of which are fully set out in the following specification and shown in the accompanying drawing which forms a part thereof.

This application, Case No. 273, comprehends certain improvements in hot wire measuring instruments, particularly adapted to measuring voltage or potential differences, and relies upon the expansion of a conductor or body under the heating effect due to the passage of a current of electricity.

My improved meter is specially adapted as a volt meter for central station work, or laboratory use. The meter is self compensating so as to be accurate for all variations of temperature of the air surrounding the instrument. For accuracy this provision must be made in all instruments employing a wire heated by the current, for if it were not so, the wire would expand or contract for ordinary changes in the temperature of the surrounding atmosphere due to the seasons, or to changes of temperature which would take place in passing from one room or part of a building to another, or from the interior of a building to the outside thereof.

In my Patent No. 502,077, dated July 25, 1893, I have set out a hot wire measuring instrument in which the pointer or needle is moved under the control of an expansible body or wire over which the current to be measured passes, combined with suitable compensating devices to prevent movement of the needle or pointer over the dial for expansions of the wire due to variations in the atmospheric temperatures. My present improvements are more particularly directed to another method of compensating for an instrument of this class. In my present case, in place of making the abutment or support for the expansion wire adjustable, I provide a compensating conductor (not traversed with a current of electricity) which by suitable connections moves or adjusts the dial plate automatically for every movement of the pointer under the action of atmospheric changes of temperature.

In carrying out my invention I provide a wire under tension through which a small current is caused to flow, and said wire in its expansion and contraction acts upon a pivoted needle or pointer which is made to traverse a scale. The scale is movable and sustained in position by a pivoted arm controlled by an expansible wire or support, whereby the scale is movable bodily under the needle or pointer, so that for any movement of the needle for changes in the atmospheric temperature, the scale will move also to maintain the zero point always under the point of the needle when no current is flowing. The instrument thus is always in a fairly calibrated condition, and thoroughly reliable. The co-efficient of expansion of the expansion wire and the coefficient of expansion of the scale controlling devices should have such a relation that the zero point of the latter will always remain under the pointer for the aforesaid variations in atmospheric temperature.

The construction of my meter will be better understood by reference to the accompanying drawing which shows a front elevation of the meter.

B is a fulcrum secured to the frame A and has a knife edge *b* preferably beveled in one direction only.

C is a pivoted needle or pointer of aluminum or other metal, and is provided with the notches *c c'* upon opposite sides. The notch *c* is received in the knife edge of the fulcrum B. The knife edge of the plate F is received in the notch *c'*. The plate F is connected to one end of an expansion wire H of platinum, German silver, or any suitable composition metal, the lower end of which is secured to an adjustable screw I attached to the abutment J on the case A. The upper part of the plate F is connected to a spring G by which the wire H is kept under tension. The wire H in expanding permits the plate F to rise, and thus releases the pointer C so that by gravity it swings upon the fulcrum point B, and traverses the dial plate D over a number of degrees corresponding to the amount of current flowing through the wire H. The positive terminal post K connects with the abutment J, and the negative terminal post K' may connect with the spring G after passing through the resistance T arranged in the back part of the case A. The resistance T is sufficiently great to prevent more than a very small current passing through the wire H. In a volt meter this resistance is in series with the wire H, whereas in the ammeter it would be in parallel so that a small current would alone pass through the wire H. Additional external resistance may be employed in connection with this volt meter to make it act as an ammeter, but in this case the scale markings would have to be modified. The dial plate is connected to links E E or otherwise movably supported so as to be adjustable in the direction of movement of the pointer or needle C. This dial plate is moved by a lever M under the action of a spring Q and is pivoted on a fulcrum L, the said lever being controlled by a plate N and expansible wire P corresponding to the wire H over which the electric current passes. One end of the wire P is connected by an adjusting screw and nut I' with the fixed abutment J and is kept under tension by the spring O. If the lever M has the same leverage or movement as the pointer or needle C, and the wire P is equal in length to the wire H and is of the same material, then the dial will be moved in the same direction and to the same extent as the pointer for all variations in atmospheric temperature. The lower end of the lever M is connected with the dial plate by a link R, but any other method of connection may be used. Any change in the length or composition of the wire P relatively to the wire $h$ will necessitate a change in the leverage, as it is evident that such changes would have to be made for any changes in the coefficient of expansion with same length, or the same coefficient of expansion and a different length of the wire P. In this manner the zero point will always remain under the pointer for all normal changes in the atmospheric temperature surrounding the instrument and when no current is flowing, but the instant the current is sent through the wire H, the pointer C has an independent movement and travels over the scale upon the dial plate D.

I do not limit myself to the details of construction as they may be modified in various ways without departing from the principles of my invention.

What I claim as new, and desire to secure by Letters Patent, is—

1. In a measuring instrument for measuring electric current, the combination of an expansion wire over which the current is caused to flow, a movable pointer or indicator moved thereby, a dial plate over which the pointer is moved, and an adjustable support for the dial plate having a coefficient of expansion relative to that of the expansion wire whereby normal changes of temperature surrounding the meter will cause the zero point to be shifted automatically to compensate for the shifting of the pointer due to the same changes.

2. In a measuring instrument for measuring electric current, the combination of a stationary fulcrum, an indicator or pointer pivoted upon the fulcrum, an expansion wire connected at one end to an abutment and at the other end to a tension device and having a part acting upon the indicator or pointer, terminals and circuits for causing the current to traverse the expansion wire, and adjustable dial plate over which the pointer or indicator moves, and means to adjust the tension of the expansion wire.

3. In a meter for measuring electric current, the combination of a stationary fulcrum, an indicator or pointer pivoted upon the fulcrum, an expansion wire connected at one end to an abutment and at the other end to a tension device and having a part acting upon the indicator or pointer, terminals and circuits for causing the current to traverse the expansion wire, a movable dial plate over which the pointer or indicator moves, a lever to move the dial plate, and a tension wire to move the lever, whereby the dial plate moves for variations in atmospheric temperature.

4. In a meter for measuring electrical currents, the combination of a stationary fulcrum, an indicator or pointer pivoted upon the fulcrum, an expansion wire connected at one end to an abutment and at the other end to a tension device and having a part acting upon the indicator or pointer, terminals and circuits for causing the current to traverse the expansion wire, a dial plate over which the pointer or indicator moves, a lever to move the dial plate, a tension wire to move the lever whereby the dial plate moves for variations in atmospheric temperature, and means to adjust the tension of the expansion and tension wires.

5. In a measuring instrument for measuring electric current, the combination of a stationary fulcrum, an indicator or pointer pivoted upon the fulcrum, an expansion wire connected at one end to an abutment and at the other end to a tension device and having a part acting upon the indicator or pointer, terminals and circuits for causing the current to traverse the expansion wire, a dial plate over which the pointer or indicator moves, and a compensating adjustable support for the dial plate whereby it is moved laterally with respect to the pointer or indicator to compensate for the shifting of the pointer or indicator due to variations in temperature of the surrounding atmosphere.

6. In a measuring instrument for measuring electric current, the combination of a stationary fulcrum, an indicator or pointer pivoted upon the fulcrum, an expansion wire connected at one end to an abutment and at the other end to a tension device and having a part acting upon the indicator or pointer, terminals and circuits for causing the current to traverse the expansion wire, a dial plate over which the pointer or indicator moves, and a compensating adjustable support for the dial plate consisting of an expansible part connected at one end with a lever acting upon the dial plate and at the other with a part secured to the main frame, whereby the dial plate is moved laterally with respect to the pointer or indicator to compensate for the shifting of the pointer or indicator due to variations in temperature of the surrounding atmosphere.

7. In a meter for measuring electric current, the combination of a stationary fulcrum, an indicator or pointer pivoted upon the fulcrum, an expansion wire connected at one end to an abutment and at the other end to a tension device and having a part acting upon the indicator or pointer, terminals and circuits for causing the current to traverse the expansion wire, a dial plate over which the pointer or indicator moves, a compensating adjustable support for the dial plate consisting of an expansible part or wire connected at one end with a lever acting upon dial plate and at the other with a part secured to the main frame whereby the dial plate is moved laterally with respect to the pointer or indicator to compensate for the shifting of the pointer or indicator due to variations in temperature of the surrounding atmosphere, and means to adjust the length of the expansion part or wire.

8. In a meter for measuring electric current, the combination of a movable pointer, an expansion wire over which the current to be measured passes adapted to actuate the said pointer, a dial plate over which the pointer travels hung upon movable parts, and a compensating device acting upon the dial to move it so as to cause the zero point to move transversely to the length of the pointer to compensate for any variations in the position of the pointer due to variations in the temperature of the surrounding atmosphere.

9. In a meter for measuring electric current, the combination of a fixed fulcrum, a pointer having a fulcrum block pivoted upon said fulcrum but having greater weight upon one side of the fulcrum than on the other so as to move the pointer by the action of gravity, an expansion wire over which the current to be measured passes acting upon the fulcrum block to oppose the action of gravity and permit it to move in accordance with the expansion of said expansion wire due to the current, a movable dial, and a compensating device for moving the dial corresponding to any movement of the pointer due to changes of temperature of the surrounding atmosphere.

In testimony of which invention I have hereunto set my hand.

R. M. HUNTER.

Witnesses:
ERNEST HOWARD HUNTER,
HELEN L. MOTHERWELL.